United States Patent [19]

Tabata et al.

[11] 4,427,874
[45] Jan. 24, 1984

[54] PULSE ARC WELDING MACHINE

[75] Inventors: Youichiro Tabata; Shigeo Ueguri, both of Hyogo; Takaji Mizuno; Masanori Mizuno, both of Aichi, all of Japan

[73] Assignee: Mitsubishi Denki Kabushiki Kaisha, Tokyo, Japan

[21] Appl. No.: 281,260

[22] Filed: Jul. 8, 1981

[30] Foreign Application Priority Data

Jul. 8, 1980 [JP] Japan ................................. 55-93097

[51] Int. Cl.³ .............................................. B23K 9/09
[52] U.S. Cl. .......................... 219/130.51; 219/130.31; 219/137.71
[58] Field of Search ....................... 219/130.51, 130.31, 219/130.32, 130.33, 137 PS, 137.71

[56] References Cited

U.S. PATENT DOCUMENTS 4,301,355 11/1981 Kimbrough et al. .......... 219/130.33

FOREIGN PATENT DOCUMENTS 620344 7/1978 U.S.S.R. ........................ 219/130.51

Primary Examiner—C. C. Shaw

Attorney, Agent, or Firm—Sughrue, Mion, Zinn, Macpeak and Seas

[57] ABSTRACT

A pulse arc welding machine in which, when any one of the material and diameter of a consumable wire electrode or the shielding gas used is varied, a peak current value and pulse width of a pulse current applied between a consumable wire electrode and a base material being welded as well as a wire feeding speed required for optimum welding conditions are automatically adjusted. The welding machine includes a consumable wire electrode, a wire feeding unit for the wire electrode, a base current source, and a pulse current source for supplying a pulse current superposed on the base current. A sensor detects the arc discharge voltage between the consumable electrode and the base material being welded. The quantity of heat applied to the electrode is corrected by comparing an output detection signal produced by the sensor with a preset arc voltage and then producing a pulse width instruction signal in response to the difference signal for setting the pulse width of the pulse current. When the detected arc voltage is large, the quantity of heat applied to the electrode by the welding current is decreased and the wire feeding speed is increased, while when the arc voltage is small, the quantity of heat applied to the wire electrode is increased and the wire feeding speed decreased.

7 Claims, 16 Drawing Figures

PULSE ARC WELDING MACHINE

BACKGROUND OF THE INVENTION

The present invention relates to pulse arc welding machine. More particularly, the invention relates to a method of controlling the feeding speed of a wire electrode and a welding arc current for a pulse arc welding machine.

There has been previously disclosed a conventional pulse arc welding machine as indicated in FIG. 1. In FIG. 1, reference numeral 1 designates a DC power source circuit which operates from an AC power source such as a three-phase AC power source, 2 a switch group of producing a predetermined pulse current and a pulse frequency by making or breaking the connection of the output from the DC power source circuit 1 in accordance with a control signal produced by a switch instructing circuit 3, 8 a DC reactor, 7 a flywheel diode for preventing the application of a reverse high voltage produced by the DC reactor to the output of the switch group immediately after the switch group 2 is opened, 9 an auxiliary power source for supplying a primary welding DC current (hereinafter referred to as "a base current") for maintaining a welding arc, 11 a reel on which a wire electrode is wound, 12 a consumable wire electrode, and 13 a welding torch to which the wire electrode 12 is fed by a wire feeding motor 14. A shielding gas is supplied to the welding torch 13 for shielding the welding section from the atmosphere during welding operations. Further, reference numeral 17 designates a base material to be welded, and 18 a control panel for setting input values to the switching circuit 3 including thereon a wire material selecting dial 19 for the material of the welding wire, a shielding gas selecting dial 20 for the type of the shielding gas, a welding voltage setting dial 21 for setting the optimum welding arc voltage, a welding or arc current setting dial 22 for setting the optimum welding arc current value (average arc current value) and a wire diameter selecting dial 23 for the diameter for the wire. Reference numeral 24 designates a peak current setting circuit which computes the peak value $I_p$ of pulse current from the combination of the material of the wire thus selected and the type of the shielding gas, computing a peak value instruction signal a. Reference numeral 25 designates a pulse width setting circuit which computes the pulse width $\tau$ of the pulse current from the welding voltage value thus set, outputting a pulse width instruction signal b, 26 a frequency setting circuit which computes a pulse frequency $N_0$ from the welding or arc current value thus set outputting a pulse frequency instruction signal c, and 27 a function selecting circuit for selecting the relationships between the pulse frequency and the wire feeding speed from the diameter of the wire thus selected, outputting a wire feeding function signal $f_1$ (N). 28 indicates a wire feeding speed computing circuit which computes a wire feeding speed v from the pulse frequency instruction signal c and the function signal $f_1$ (N), outputting a wire feeding speed instruction signal d, and 29 a base current instructing circuit to which a signal e for setting a base current value $I_{BO}$ to be supplied from the auxiliary power source 9 is inputted.

FIG. 2 shows a welding current waveform 30 in the aforementioned conventional pulse arc welding machine during a welding operation.

The operation of the conventional pulse arc welding machine thus constructed will be described.

The material of the wire to be fed into the welding torch 13, the diameter of the wire and the type of shielding gas introduced into the welding torch are determined beforehand, and the wire material selecting dial 19 and the shielding gas selecting dial 20 are set in accordance with the selected material of the wire and type of the shielding gas. The values set with the dials 19 and 20 are applied to the inputs of the peak current setting circuit 24 which in response produces a peak value instruction signal a which is applied to one input of the switch instructing circuit 3.

Subsequently, a welding or arc current value is determined in accordance with the thickness and the like of the base material, and the welding current setting dial 22 is set in accordance with the welding current value thus predetermined. The set value from the dial 22 is applied to the input of the frequency setting circuit 26 which in response thereto produces a pulse frequency instruction signal c the value of which is set substantially in proportion to the welding or arc current. The signal c is in turn applied to both the other input c of the switch instructing circuit 3 and to one input of the wire feeding speed computing circuit 28.

Then, the wire diameter selecting dial 23 is set in accordance with the chosen diameter of the wire. The data thus selected is in turn applied to the input of the function selecting circuit 27, which consequently produces a corresponding selected function signal $f_1$ (N) which is in turn applied to the other input of the computing circuit 28.

After the wire feeding speed computing circuit 28 has received both the pulse frequency instruction signal c and the function signal $f_1$ (N), the computing circuit 28 sequentially produces a wire feeding speed instruction signal d which is applied to the input of the wire feeding motor 14.

Thereafter, a welding or arc voltage capable of providing an optimum welding bead under given welding conditions is effectively selected and the welding voltage setting dial 21 is set in accordance with the welding or arc voltage value thus determined. The value set by the dial 21 is applied to the input of the pulse width setting circuit 25 which sequentially produces an instruction signal b corresponding to the pulse width $\tau$, which varies substantially in proportion to the welding or arc voltage value which is applied to another input of the switch instructing circuit 3.

After the signals a, b and c are supplied from the peak current setting circuit 24, the frequency setting circuit 26 and the pulse width setting circuit 25 to the switch instructing circuit 3, the switch instructing circuit 3 sets a welding or arc current. The resulting current waveform 30 having a pulse width $\tau$, a pulse peak current $I_p$ and a pulse frequency $N_0$ as shown in FIG. 2.

Further, the signal d applied from the wire feeding speed computing circuit 28 to the wire feeding motor 14, as described above, sets the speed of the motor 14 and hence the wire feeding speed v.

With the welding or arc current thus set by the switch instructing circuit 3 as described above, the arc current will melt the wire electrode and accordingly weld the base material with an arc length and hence arc voltage set in such a manner that the rate of production of molten wire electrode droplets is optimized by proper setting of the wire feeding rate.

The base current $I_{BO}$ acts as an arc maintaining current, the required minimum value of which depends slightly upon the material of the wire and the diameter of the wire and the like. However, when the base current is set at the highest value such as, for instance, 20A, no readjustment of the pulse arc welding machine is necessary.

In the conventional pulse arc welding machine constructed as described above, if any one of the material of the consumable wire electrode to be welded, the diameter of the wire and the type of the shielding gas is varied, the peak current value $I_p$, the pulse width $\tau$ and the wire feeding speed v of the pulse current for producing an optimum bead will vary accordingly. Therefore, the respective dials 21, 22 and 23 should be reset in accordance with the changed values of the material and the diameter of the wire electrode and the type of the shielding gas. It is of course complicated and time consuming to adjust the pulse arc welding machine for an optimum welding state in this manner each time one of these parameters is varied.

SUMMARY OF THE INVENTION

A primary object of the present invention is to eliminate the aforementioned drawbacks of the conventional pulse arc welding machine.

More specifically, a primary object of the invention is to provide a pulse arc welding machine in which, when any one of the material and diameter of a consumable wire electrode or a shielding gas is varied, the peak current value $I_p$ and the pulse width $\tau$ of the pulse current as well as the wire feeding speed v required for an optimum welding operation are automatically adjusted.

In accordance with these and other objects of the invention, there is provided a pulse arc welding machine including a consumable wire electrode, a wire feeding unit for feeding the consumable wire electrode toward a base material, a base current source for supplying a base current flowing between the consumable wire electrode and the base material, a pulse current source for supplying a pulse current superposed on the base current, means for setting the frequency of the pulse current, a sensor for detecting an arc discharge voltage between the consumable electrode and the base material, means for correcting a quantity of heat applied to the electrode, and means for setting a wire feeding in accordance with the pulse frequency thus set, the diameter of the consumable wire electrode, and the output of the correcting means. The correcting means includes means for comparing an output detection signal $V_a$ produced by the sensor with a predetermined arc voltage $V_0$ to produce a difference signal $V_s$ and means operating in response to the difference signal $V_s$ for producing a pulse width instruction signal for setting a pulse width of the current. The correcting means operates such that, when the detected arc voltage is large, at least one of a quantity of the heat applied to the wire electrode by a welding current (composed of the base current and the pulse current) being decreased or the wire feeding speed being increased is performed, and when the detected arc voltage is small, at least one of the quantity of heat applied to the wire electrode by the welding current being increased or the wire feeding speed being decreased is performed.

DESCRIPTION OF THE PREFERRED EMBODIMENTS

Figure 3:
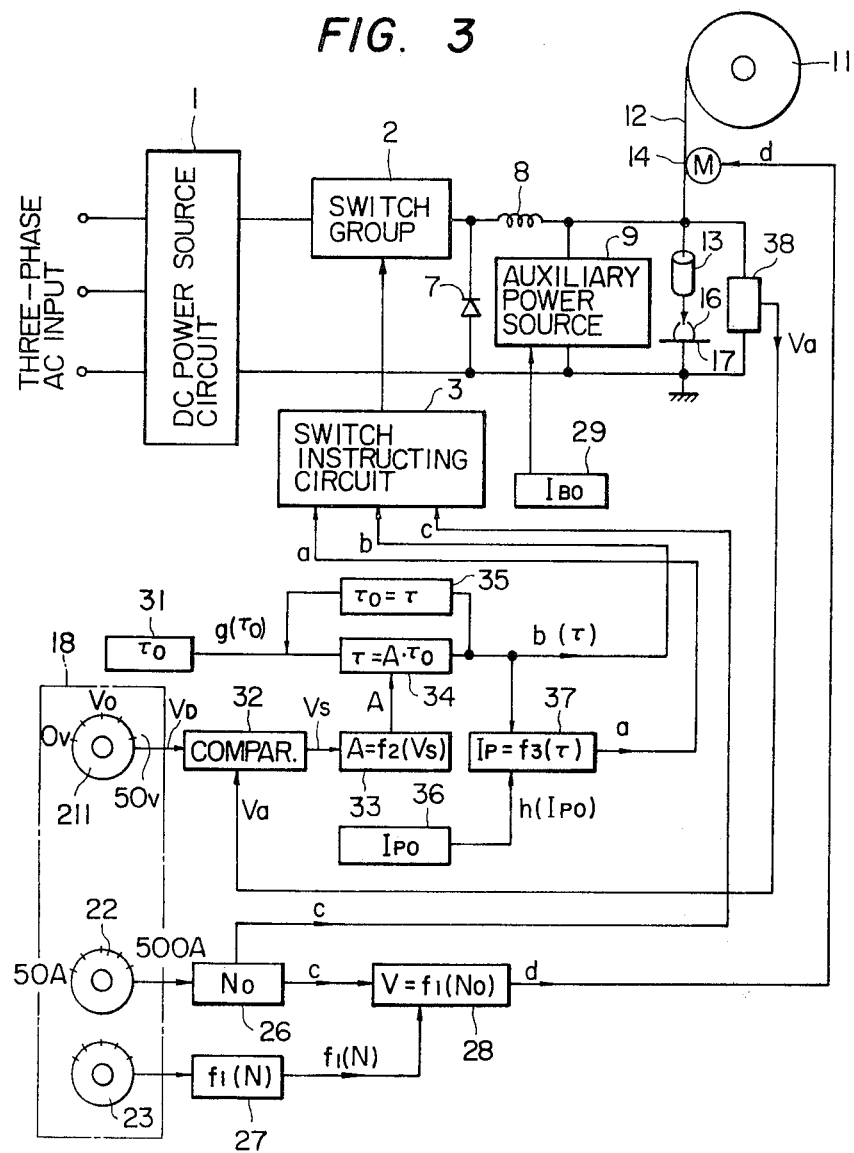
FIG. 3 is a block diagram showing a first preferred embodiment of a pulse arc welding machine of the invention.

FIG. 3 shows a first preferred embodiment of a pulse arc welding machine according to the invention in which reference numeral 211 on a control panel 18 designates a welding voltage setting dial for setting a welding arc voltage $V_0$, 31 an initial pulse width instructing circuit for producing an initial pulse width instruction signal g corresponding to an initial pulse width $\tau_0$, 38 an arc voltage detecting sensor for detecting variations in arc length from an arc voltage $V_a$, 32 a comparator for comparing the detected arc voltage $V_a$ with the welding arc voltage $V_0$ to produce a difference signal $V_s=V_0-V_a$, 33 an amplification factor computing circuit for determining an amplification factor A for amplifying the pulse width setting signal g in response to the difference signal $V_s$ from the comparator 32, and 34 a pulse width computing circuit for producing a pulse width instruction signal b corresponding to a pulse width $\tau$ upon reception of an initial pulse width instruction signal g and in accordance with an amplification factor A and applying an output signal as a pulse width instruction signal b to the switch instructing circuit 3. The pulse arc welding machine further includes an initial pulse width correcting circuit 35 for correcting the initial pulse width setting signal $\tau_0$ to a pulse width setting signal $\tau$, a minimum peak current instructing circuit 36 for producing a minimum peak value instruction signal h corresponding to a minimum peak current $I_{po}$, and a peak current computing circuit 37 for computing a peak current $I_p=f_3(\tau)$ from the minimum peak current instruction signal h and the pulse width $\tau$ to output a peak current instruction signal a which is applied to the switch instructing circuit 3.

A pulse frequency instruction signal c set by a welding circuit setting dial 22 and a wire feeding speed instruction signal d computed by a wire feeding speed computing circuit 28 from the pulse frequency instruction signal c and from a wire feeding function signal $f_1$ (N) set by a wire diameter selecting dial 23 are calculated in the same manner by a frequency setting circuit 26 and by the wire feeding speed computing circuit 28 and a function selecting circuit 27, respectively. These are applied to another input of the switch instructing circuit 3 and a wire feeding motor 14, respectively.

Figure 4:
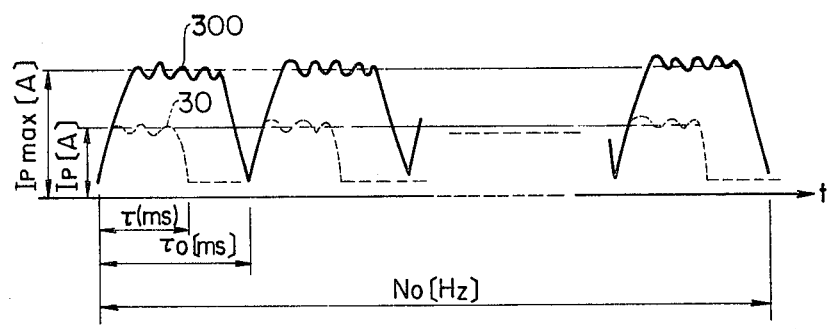
FIG. 4 is a graphical view showing a waveform of the welding current of the first embodiment of the invention.
Figure 5:
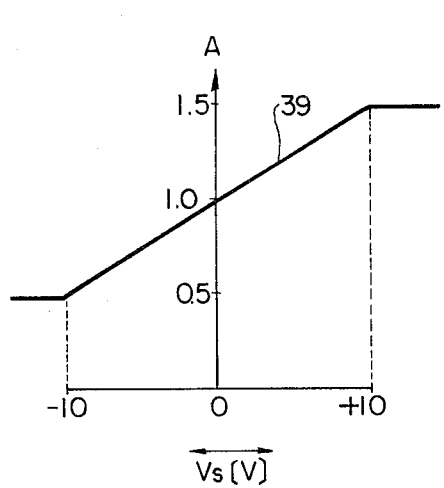
FIG. 5 is a graphical view showing an amplification factor characteristic with respect to a difference voltage.

FIG. 4 shows the waveform of pulse current produced by the first preferred embodiment of a welding machine of the invention. When a welding operation is started in the pulse arc welding machine of the invention, a pulse current as indicated by a characteristic curve 300 (solid line) will flow. The current waveform is then changed to that indicated by a characteristic curve 30 as an optimum welding current in accordance with a combination of the material of the consumable wire electrode, the diameter of the wire and the type of shielding gas. In FIG. 5 a curve 39 is a graphical representation indicating the characteristic change of the amplification factor A with respect to the difference signal Vs from the amplification factor computing circuit 33.

The operation of the first embodiment of the pulse arc welding machine thus constructed of the invention will now be described.

The diameter of the consumable wire fed to the welding torch 13 is first determined, and the wire diameter selecting dial 23 set in accordance with the diameter of the wire. Subsequently, a welding or arc current value is set in accordance with the thickness and the like of the base material and the welding current setting dial 22 is set in accordance with the chosen welding current value. The value set from the dial 22 is in turn applied to the input of the frequency setting circuit 26, which sequentially produces a pulse frequency instruction signal c substantially in proportion to the welding or arc current. The signal c is in turn applied to both the other input c of the switch instructing circuit 3 and one input of the wire feeding speed computing circuit 28, in the same manner as in the conventional pulse arc welding machine.

Thereafter, the wire diameter selecting dial 23 is set in accordance with the diameter of the wire. The value thus set is in turn applied to the input of the function selecting circuit 27, which sequentially produces a selected function signal $f_1$ (N) which is applied to the other input of the computing circuit 28 in the same manner as in the conventional pulse arc welding machine.

After the wire feeding speed computing circuit 28 has received both the pulse frequency instruction signal c and the function signal $f_1$ (N) as described above, the computing circuit 28 sequentially produces a wire feeding speed instruction signal d which is in turn applied to the input of the wire feeding motor 14, also in the same manner as in the conventional pulse arc welding machine as described above.

Thereafter, an arc length, which corresponds directly to the arc or welding voltage, capable of providing an optimum welding bead under given welding conditions is effectively set and the welding voltage setting dial 211 is set in accordance with the welding voltage $V_0$.

When the DC power source circuit 1 and the wire feeding motor 14 are activated with the dials 211, 22 and 23 set as described above, the initial pulse width instruction signal $\tau_0$ is applied from the initial pulse width instructing circuit 31 to the pulse width computing circuit 34. The pulse width instruction signal b outputted by the computing circuit 34 is coupled to the input b of the switch instructing circuit 3. Further, a minimum peak current instruction signal h, corresponding to the minimum peak current $I_{po}$, is applied from the minimum peak current instructing circuit 36 to the peak current computing circuit 37 for computing a peak current from the minumum peak current instruction signal and the pulse width instruction signal from the computing circuit 34. The peak current computed by the computing circuit 37 is in turn applied as a pulse peak current instruction signal a to the input a of the switch instructing circuit 3. In addition, the pulse frequency instruction signal c is applied from the frequency setting circuit 26 to the input c of the switch instucting circuit 3.

When the signals a, b and c are thus applied from the computing circuits 37 and 34 and the setting circuit 26 to the switch instructing circuit 3, the switch instructing circuit 3 controls a switch group 2 in response thereto for thereby producing a predetermined pulse current and a pulse frequency by making and breaking the connection of the output from the DC power source circuit 1 in accordance with the initial pulse current characteristic curve 300 indicated in FIG. 4 having a pulse width $\tau_0$, a peak current $I_{pmax}$ and a frequency $N_0$ in a welding or arc circuit of the pulse arc welding machine of the invention.

The wire feeding speed instruction signal d is applied from the wire feeding speed computing circuit 28 to the wire feeding motor 14 as described above. The consumable wire electrode is thus fed at a wire feeding speed responsive to the speed instruction signal d into the welding torch 13 and a welding arc is generated between the wire electrode and the base material 17 in the same manner as in the conventional pulse arc welding machine.

During the generation of arc between the wire electrode and the base material 17, the arc voltage Va is detected by the arc voltage detecting sensor 38 in the welding circuit, and the detected arc voltage Va is applied to the other input of the comparator 32. The comparator 32 compares the detected arc voltage Va with the welding arc voltage $V_0$ producing a difference signal $Vs = V_0 - Va$.

The difference signal Vs thus produced is applied to the input of the amplification factor computing circuit 33, which computes an amplification factor $A = f(Vs)$ as indicated by a characteristic curve 39 in FIG. 5. The amplification factor A thus computed is applied to the other input of the pulse width computing circuit 34. The pulse width computing circuit 34 amplifies the initial pulse width instruction signal h in response to the amplification factor A received from the computing circuit 33 and produces the pulse width instruction signal b. The pulse width instruction signal b is fed back through the initial pulse width correcting circuit 35 connected in parallel with the computing circuit 34 where it is added to the initial pulse width instruction signal g. Thus, the initial pulse width instruction signal g is amplfied by the circuit 34 to yield an amplified pulse width instruction signal g.

The amplified pulse width instruction signal b is applied to one input of the switch instructing circuit 3. The pulse width instruction signal b is also applied to the other input of the peak current computing circuit 37, which computes a peak current instruction signal a corresponding to the peak current $I_p = f_3(\tau)$ in response to the minimum peak current instruction signal h applied to the one input of the computing circuit 37 as described above and which is determined in accordance with the pulse width instruction signal b from the computing circuit 34. The peak current instruction signal a thus determined is applied to the input a of the switch instructing circuit 3.

With the signals a, b and c are applied to the switch instructing circuit 3 as described above, the switch instructing circuit 3 controls the switch group 2 to set a pulse current, as indicated by a curve 300 in FIG. 4 so that a pulse current width $\tau$ and the actual peak current value $I_p$ vary as desired and the arc voltage Va approaches the arc voltage $V_0$.

The arc voltage Va thus varied is detected by the sensor 38 and is applied to the comparator 32 as described above. Consequently, the comparator 32 produces a reduced difference signal $Vs = V_0 - Va$. The difference signal Vs is in turn applied to the amplification factor computing circuit 33 which computes the amplification factor A. In this manner, the arc voltage Va detected by the sensor 38 rapidly approaches the arc voltage $V_0$. When the detected arc voltage Va reaches $Va = V_0$ in this manner, the waveform of the pulse current flowing in the welding circuit has a pulse current width $\tau$, a peak current $I_p$ and a pulse frequency $N_0$, as desired for optimum welding conditions. Thus, the pulse current is set for the optimum welding state for welding operations of the pulse arc welding machine of the invention.

Figure 6:
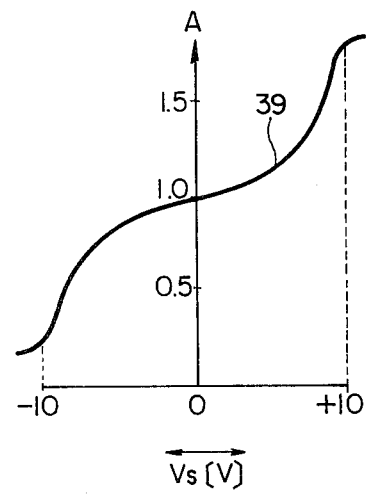
FIG. 6 is a view similar to FIG. 5 but showing another example of the characteristic curve of the amplification factor.

FIG. 6 shows an example of a curve 39 of the amplification factor A of the pulse width computing circuit 34 as it varies with respect to the difference signal Vs from the amplification factor computing circuit 33. Since the curve of the amplification factor A of the pulse width computing circuit 34 thus varied incorporates a characteristic similar to a function $F(x) = X^3$, in case that the absolute value of the difference voltage Vs is large corresponding to the difference between the arc voltage and the detected arc voltage being large, the change of the amplification factor A becomes larger. As a consequence, the computing circuit 34 will operate to place the pulse arc welding condition as early as possible to the optimum welding condition. Further, as the absolute value of the difference voltage Vs becomes smaller, the rate of change of the amplification factor A of the computing circuit 34 will approach "0". Accordingly, the pulse current will reach a steady constant value as early as possible without fluctuation and thus provides for stable welding operations in the pulse arc welding machine of the invention.

A specific technique for operating the pulse arc welding machine of the invention will be described with specific numerical data applied to the described first embodiment of the invention. Generally, the pulse current and the pulse peak current of the waveform of the pulse current used in this embodiment must satisfy the following two conditions as will be described below;

(1) The pulse current should exceed a current value which is sufficient to form the molten portion of the wire electrode into small droplet by an electromagnetic contractive force produced by the current flowing through the wire electrode by means of an arc between the wire electrode and the base material thereby effecting droplet transfer welding (or spray transfer welding). (This current value will be referred to as "a critical current value $I_c$.")

(2) The pulse current should fall within limits such that the quantity of heat applied to the wire electrode during one pulse period is set so that little splattering occurs during a welding operation and there is no extinction of the arc. (Such range is hereinafter referred to as "an optimum heat quantity range W.")

Tables 1 and 2 show experimental results of the aforementioned critical current $I_c$ and the optimum heat quantity range W obtained for materials and diameters of the wire electrode and shielding gases commonly used.

TABLE 1

| Wire Material | Shielding Gas | Wire Diameter (mm) | Critical Current Value $I_c$ (A) |
|---|---|---|---|
| Soft Steel | Ar:$CO_2$ 8:2 | 0.9 | 275 |
|  |  | 1.2 | 400 |
|  |  | 1.6 | 550 |
|  | Ar:$CO_2$ 98:2 | 0.9 | 250 |
|  |  | 1.2 | 370 |
|  |  | 1.6 | 450 |
| Stainless Steel | Ar:$O_2$ 97:3 | 0.9 | 220 |
|  |  | 1.2 | 280 |
|  |  | 1.6 | 375 |
| Aluminum | Ar only | 1.6 | 240 |

TABLE 2

| Wire material | Wire diameter d (mm) | Optimum droplet diameter range a (mm) | Optimum heat amount (J) | Quantity of heat of wire extension (10 mm) $W_2$ (J) | Quantity of heat due to arc heat $W_1$ (J) | Quantity of charge range per pulse of current $Q_1$ (c) |
|---|---|---|---|---|---|---|
| Soft steel | 0.9 | 0.99–1.43 | 4.96–14.6 | Approx. 2.0 | 2.96–12.6 | 0.85–3.6 |
|  | 1.2 | 1.14–1.44 | 7.4–15.1 | Approx. 2.0 | 5.4–13.1 | 1.54–3.7 |
|  | 1.6 | 1.24–1.46 | 9.4–15.7 | Approx. 2.0 | 7.4–13.7 | 2.11–3.9 |
| Stainless steel | 0.9 | 0.99–1.43 | 4.96–14.6 | Approx. 4.0 | 0.96–10.6 | 0.27–3.0 |
|  | 1.2 | 1.14–1.44 | 7.4–15.1 | Approx. 4.0 | 3.4–11.1 | 0.97–3.17 |
|  | 1.6 | 1.24–1.46 | 9.4–15.7 | Approx. 4.0 | 5.4–11.7 | 1.54–3.3 |
| Aluminum | 1.6 | 1.24–1.46 | 1.95–3.8 | Approx. 0.0 | 1.95–3.8 | 0.56–1.09 |

Table 2 indicates additionally the optimum heat quantity $W_2$ at the extension of the wire electrode (for a wire diameter of approximately 10 mm), the optimum droplet diameter range a at that time, the quantity $W_1$ of heat due to arc heating, and the pulse current range ($Q_1 = W_1/3.5$) calculated from the quantities of heat ($W_1 = W - W_2$) and $W_1$.

It has been determined experimentally from the data in Tables 1 and 2 that, in order to conduct an optimum welding operation, and peak current of the pulse current should be variable at least in a range of from 220 A to 550 A and the total quantity of charge of the pulse current should be variable in a range of from 0.27 coulombs to 3.9 coulombs. Further, it has also been determined experimentally from the data in Tables 1 and 2 that the magnitude of the critical current $I_c$ and the quantity of charge have a mutual relationship. It may thus be appreciated that the peak current $I_p$ of the pulse current should vary substantially proportionally with respect to the pulse width $\tau$, where the pulse width $\tau$ is calculated by dividing the charge quantity $Q_1$ by the peak current $I_p$.

The relation between the peak current and the pulse width can be represented by:

$$I_p = 140\tau - 80 \text{ (A)} \quad (\tau \text{ is in ms}).$$

The peak current computing circuit 37 in FIG. 3 computes the peak current on the basis of the above expression.

The quantity of charge per pulse in terms of the peak current $I_p$ and the pulse width can be represented by:

$$Q = I_p \cdot \tau = (140\tau^2 - 80\tau) \times 10^{-3} \text{ (coulombs)}.$$

In the case where the peak current value and the pulse width of the pulse current are determined so that the quantity of heat W applied in the wire electrode per pulse is within the optimum heat quantity range indicated in Table 2, the wire feeding speed v (cm/s) must be equal to the product of the volume of molten droplets of diameter a (mm$\phi$) formed per pulse and the number $N_0$ of pulses per unit time (seconds). This can be expressed as follows:

$$\underbrace{v \cdot \times \left(\frac{d}{2}\right)^2 \times \tau \times \frac{1}{100}}_{\text{Amount of wire fed per unit time}} = \underbrace{\frac{4}{3} \times \left(\frac{a}{2}\right)^3 \times \tau \times N \times \frac{1}{1000}}_{\text{Amount of metal melted per unit time}}$$

From this expression, the wire feeding speed v (cm/s) is:

$$v = 0.0667 \times \frac{a^3}{d^2} \times N \text{ (cm/s)}.$$

The function selecting circuit 27 in FIG. 3 computes on the basis of this expression.

Figure 1:
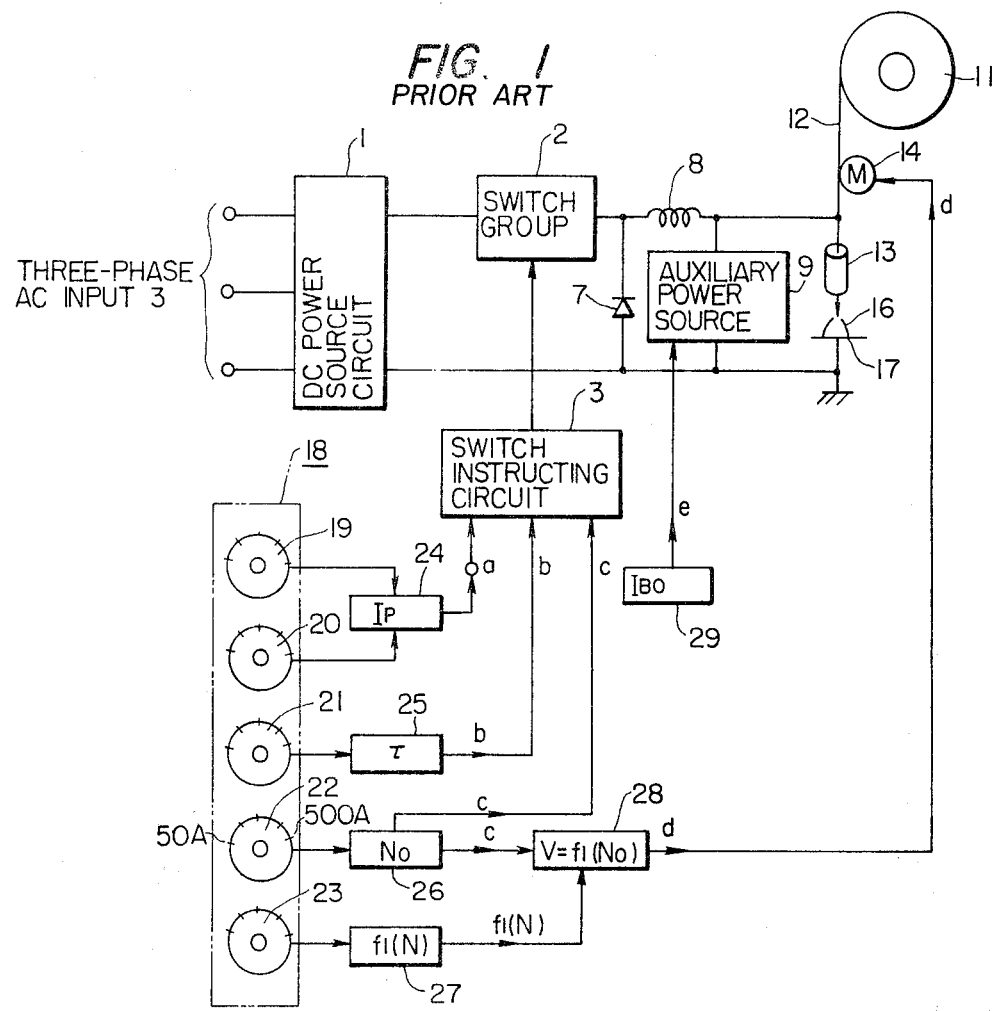
FIG. 1 is a block diagram of a conventional pulse arc welding machine.
Figure 2:
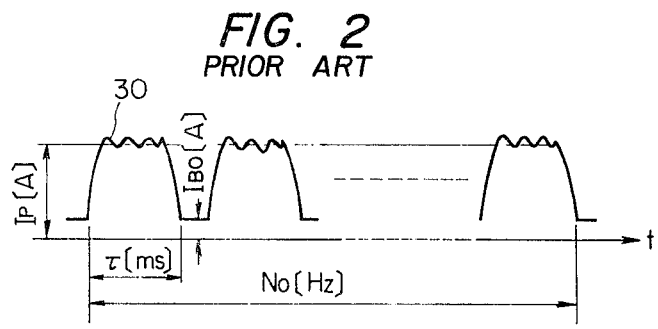
FIG. 2 is a graphical view showing a waveform of the welding current of the conventional pulse arc welding machine.
Figure 7:
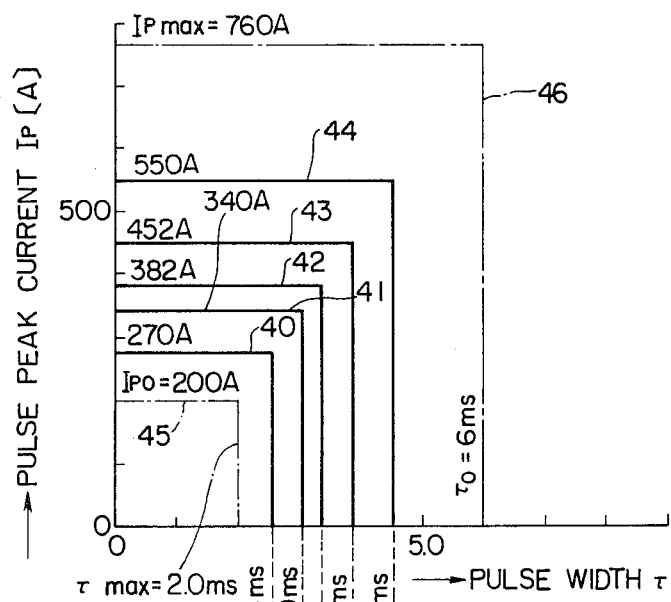
FIG. 7 is a graphical view showing the pulse which vs. pulse peak current characteristic of the pulse current of the first embodiment of the invention.

FIG. 7 shows relations between the pulse current width of one pulse of current and the pulse peak current $I_p$, where the one-dot broken line 45 indicates a characteristic curve of a minimum pulse current waveform capable of varying the pulse current while the one-dot broken line 46 indicates a characteristic curve of the maximum pulse current waveform capable of varying the pulse current as exemplified. Although the pulse current waveform is shown as a rectangular waveform for explanatory purposes, the actual pulse current waveform is as shown in FIG. 2.

Further, solid line curves 40, 41, 42, 43 and 44 are, respectively, characteristic curves of the pulse current width $\tau$ and the peak current $I_p$ with various conditions of a wire electrode and a shielding gas when the welding voltage setting dial 211 is set to the welding arc voltage $V_0$ corresponding to an arc length for obtaining the optimum welding bead for the pulse arc welding machine of the invention shown in FIG. 3. The characteristic curve 30 corresponds to the case where the shielding gas is argon and the wire electrode is aluminum with a diameter of 1.6 mm; the characteristic curves 41, 43 and 44 correspond to the case where the shielding gas is a mixture of Ar and $CO_2$ in a ratio of 8:2 and the wire electrodes are soft steel with diameters of 0.9, 1.2 and 1.6 mm; and the characteristic curve 42 corresponds to the case where the shielding gas is a mixture of Ar and $CO_2$ in a ratio of 97:3 and the wire electrode is made of stainless steel with a diameter of 1.2 mm.

Figure 8:
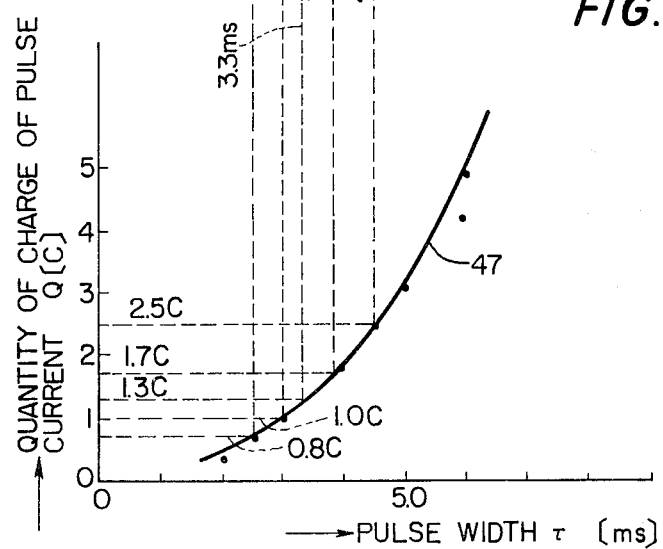
FIG. 8 shows a characteristic curve of the quantity of charge of the pulse current.

FIG. 8 indicates a quantity Q of charge per pulse of the welding current with a characteristic curve 47 representing an example of the Q characteristics of the pulse arc welding machine of the invention.

When the various values of the current pulse width under the various conditions of FIG. 7 approach the corresponding values of the characteristic curve 47 in FIG. 8, the quantities Q of charge for the respective characteristic curves 40, 41, 42, 43 and 44 become respectively 0.8, 1.0, 1.3, 1.7 and 2.5 coulombs. These values are indicated in the columns of the optimum charge quantity range in Table 2.

Figure 9:
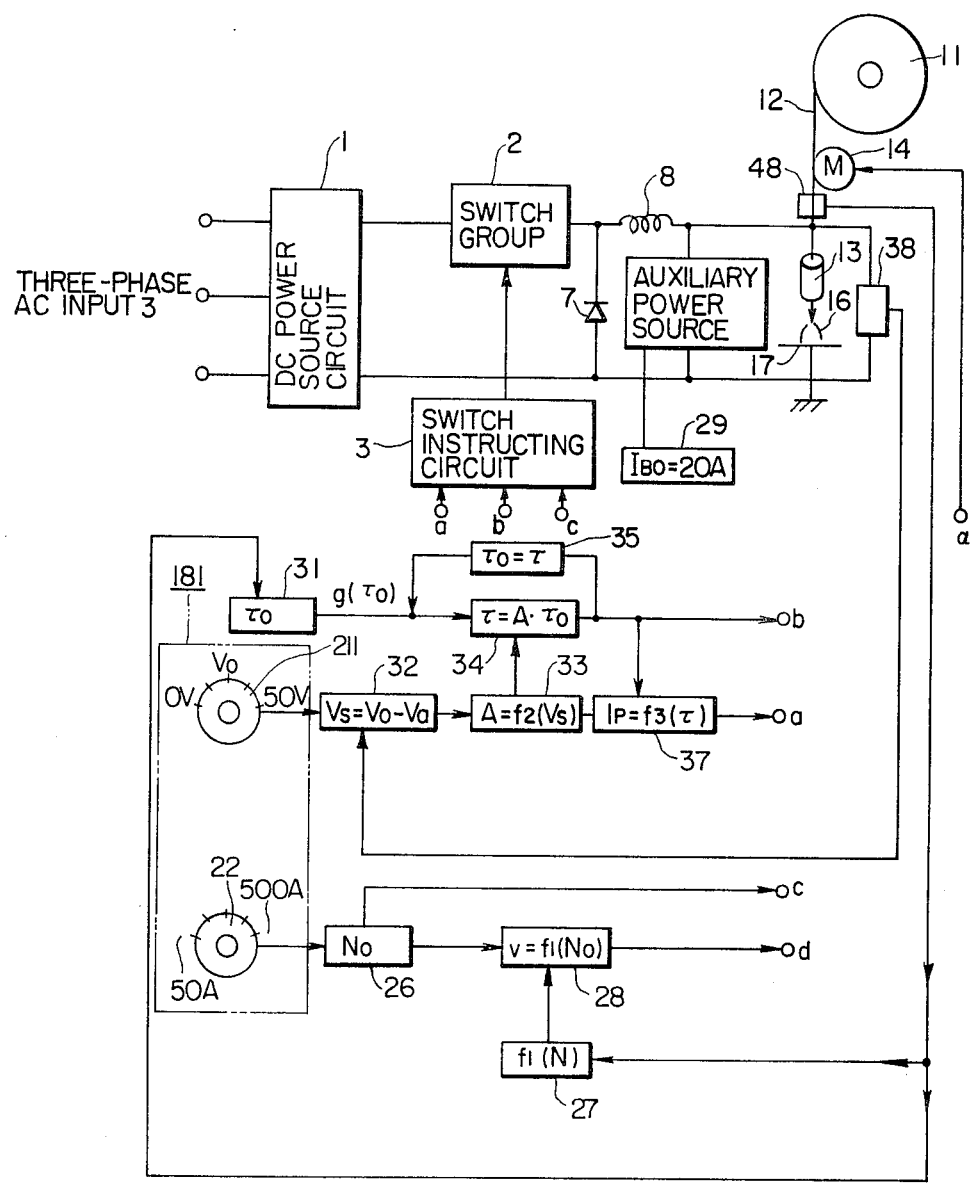
FIG. 9 is a block diagram showing another preferred embodiment of the pulse arc welding machine of the invention and FIG. 10 is a block diagram of a control circuit system of the pulse arc welding machine of the invention.

A second preferred embodiment of a pulse arc welding machine constructed according to the invention is shown in FIG. 9 in which a wire electrode material and diameter detecting sensor 48 is provided additionally at a wire feeding unit and the wire diameter selecting dial 23 in the first embodiment shown in FIG. 3 is omitted.

In this embodiment, an output signal detected by the sensor 48 is applied to both the other input of the function setting circuit 27 and the input of the initial pulse width instructing circuit 31. With the detected output signal thus applied from the sensor 48 to the function setting circuit 27, the circuit 27 automatically selects an appropriate function $f_1$ (N) and applies the appropriate function signal to the other input of the wire feeding speed computing circuit 28 which in turn computes a wire feeding speed instruction signal d, which is applied to the wire feeding motor 14 in the same manner as in the convetional pulse arc welding machine.

With the detected output signal also applied from the sensor 48 to the initial pulse width instructing circuit 31, the circuit 31 automatically sets an initial pulse current width $\tau_0$ with an initial pulse width instruction signal g and applies the initial pulse current width instrication signal g to the pulse width computing circuit which in response produces a pulse width instruction signal b which is applied to one input of the switch instructing circuit 3, in the same manner as in the first-described embodiment of the pulse arc welding machine of the invention.

It is noted that although the first embodiment of the pulse art welding machine of the invention shown in FIG. 3 includes a sensor arrangement for detecting the length of the arc from the arc voltage, including the arc voltage detecting sensor 38 for setting the pulse width instruction signal b through the comparator 32, the amplification factor computing circuit 33, the pulse width computing circuit 34 and the initial pulse width correcting circuit 35, the device for detecting the length of the arc may also take the form of an electrical device for detecting the welding arc current, an optical device detecting the light produced by the welding arc and a mechanical device for detecting the same for controlling the peak current $I_p$ of the pulse current, the base current value $I_B$, the fine adjustments of the pulse frequency $N_0$, the fine adjustment of the wire feeding speed v, and the fine adjustment of the function $f_1$ (N) of the function setting circuit 27 and a combination of any one or more of these so as to sufficiently control them through experiments.

Figure 10:
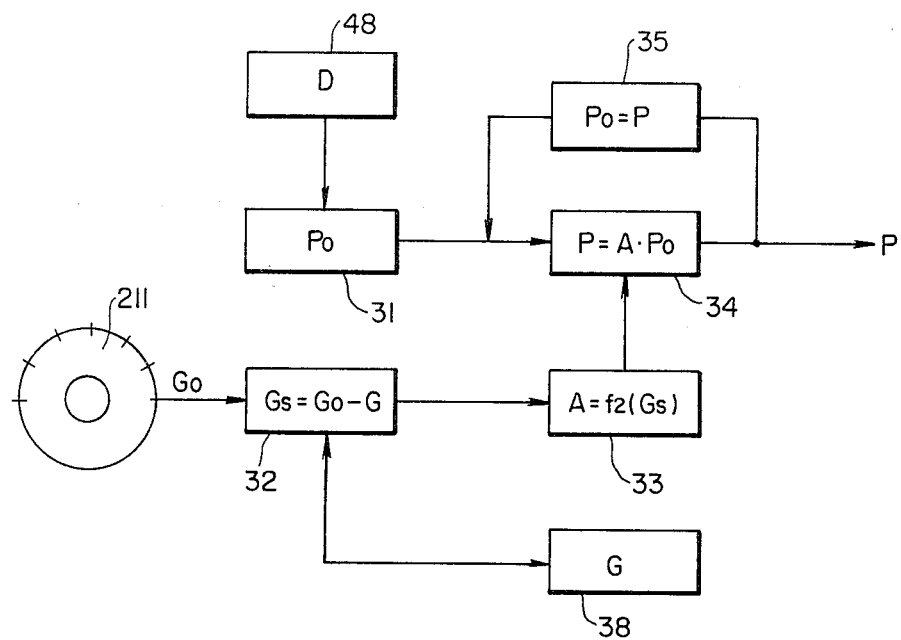

FIG. 10 shows a block diagram of the control system employed in the above embodiments of the invention, wherein reference character G indicates a sensor signal corresponding to the length of an arc, $G_0$ a signal corresponding to the arc length, A an amplification factor, D a sensor signal corresponding to the material and diameter of the wire electrode, $P_0$ an initial control signal and P a control signal.

Detailed circuit diagrams of blocks 29, 3, 38, 32, 26, 22, 211 and 28 shown in FIG. 3 are described in co-pending U.S. patent application Ser. No. 281,263, filed on even date herewith. In FIG. 3 of the present application, block 29 corresponds to block 316 in the co-pending application, 3 to 320, 38 to 29, 32 to 303, 26 to 313, 22 to 318b, 211 to 318a, and 28 to 306.

Figure 11:
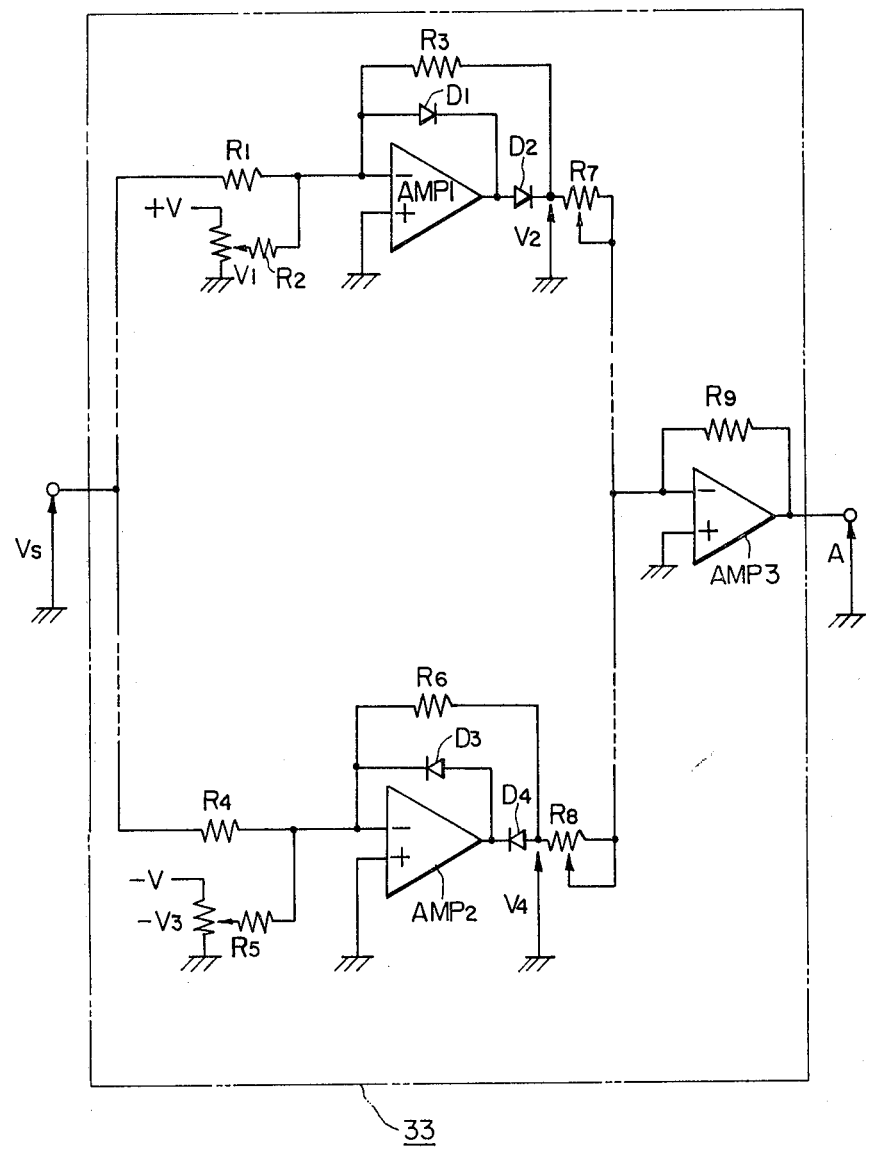
FIG. 11 is a circuit diagram of the arithmetic circuit shown in FIG. 10.

FIG. 11 is a detailed circuit diagram showing an example of the arithmetic circuit 33. The circuit 33 is composed of amplifiers Amp1–Amp3, resistors R1–R9 and diodes D1–D4.

Assuming that the resistance values of the resistors R1 and R2 are equal to one another, when the input voltage Vs is higher than a reference voltage-$V_1$, the diodes D1 and D2 are rendered conductive and a voltage V2 appearing at a cathode terminal of the diode D2 is thus zero. When the input voltage Vs is lower than the reference voltage-$V_1$, the diodes D1 and D2 are rendered non-conductive. The voltage $V_2$ is expressed as follows:

$$V_2 = -\frac{R3}{R1}(V_1 + V_s).$$

Figure 12A:
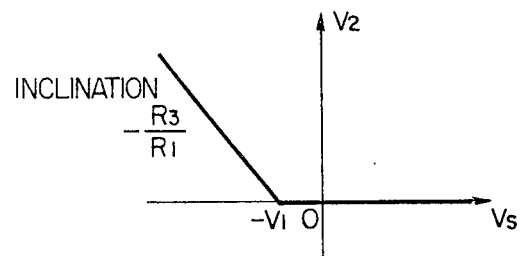
FIGS. 12A through 12D show various waveform diagrams of the voltages appearing in the circuit of FIG. 11.
Figure 12B:
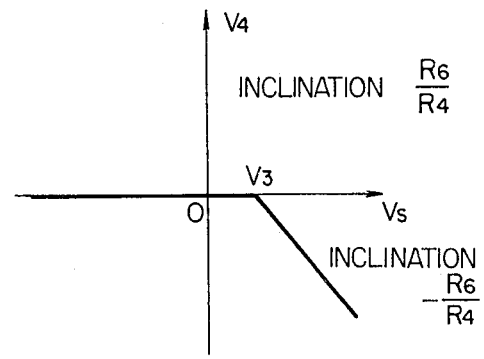

FIG. 12A shows the relation between Vs and $V_2$. Similarly, FIG. 12B shows the relation between a voltage V4 appearing at the anode terminal of the diode D4 and the input voltage Vs where R4=R5.

Accordingly, an output A from the Amp 3 can be expressed:

$$A = -\frac{R9}{R7}V2 - \frac{R9}{R8}V4.$$

Figure 12C:
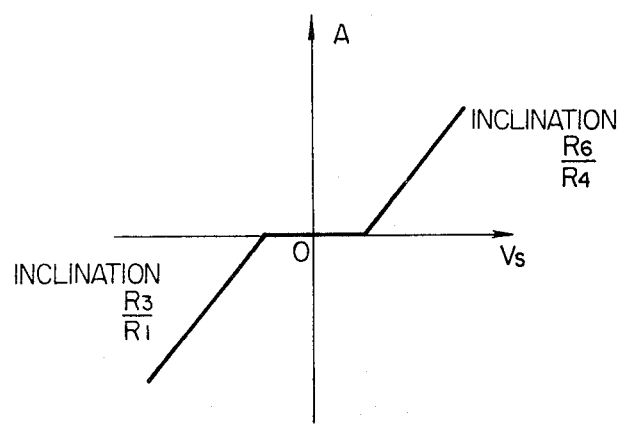

Therefore, the output A can be expressed by the sum of the V2.(constant) and V4.(constant). More specifically, assuming that the voltage Vs, V2 and V4 satisfy the relations shown in FIGS. 12A and 12B and $$\frac{R9}{R7} = \frac{R9}{R8} = 1,$$

the output A is obtained by combining an inverted waveform shown in FIG. 12A and an inverted waveform shown in FIG. 12B, the waveform of which is shown in FIG. 12C.

Figure 12D:
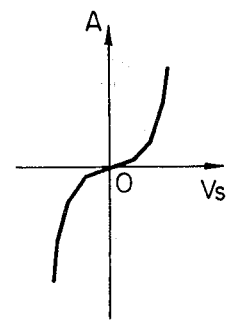

With a plurality of circuits, including amplifiers Amp1 and Amp2, connected in parallel, an output shown in FIG. 12D can be obtained by selectively changing the reference values such as V1 or −V3. It is also possible to form the output A as $A \propto f(V_s^3)$.

The arithmetic circuit 34 operates to calculate the product of the pulse width input $\tau$ and the output A of the circuit 33. A well-known type of multiplier, for example, type AD 534 produced by Analog Devices Co., can be used. The circuit 35 operates to sample and hold (n-1)th pulse width and to produce it as an n-th pulse width. The sample-and-hold circuit is well known in the art. The sampling operation is carried out in response to the peak of the pulse current. One sampling operation is carried out one per pulse period.

Figure 13:
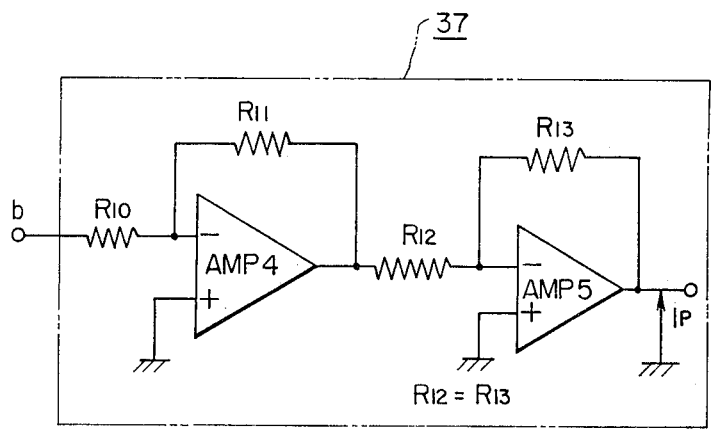
FIG. 13 shows a circuit diagram of the peak current computing circuit shown in FIG. 3.

A detailed diagram of the circuit 37 is shown in FIG. 13. The circuit 37 operates to determine the relation between the pulse width and the peak current as an approximately linear curve. Resistors R10 and R11 are provided to firmly adjust the relation. Amp 5 designates an inverter amplifier.

What is claimed is:

1. A pulse arc welding machine comprising:
    a consumable wire electrode;
    a wire feeding unit for feeding said consumable wire electrode toward a base material;
    a base current source for supplying a base current flowing between said consumable wire electrode and said base material;
    a pulse current source for supplying a pulse current superposed on said base current flowing between said consumable wire electrode and said base material;
    means for setting a frequency of said pulse current;
    a sensor for detecting an arc discharge voltage between said consumable electrode and said base material;
    means for correcting a quantity of heat applied to said electrode comprising means for comparing an output detection signal $V_a$ produced by said sensor with a predetermined arc voltage $V_o$, to produce a difference signal $V_s$;
    means operating in response to said difference signal $V_s$ for producing a pulse width instruction signal for setting a pulse width of said pulse current comprising means for supplying a value representing an initial pulse width, an amplification factor computing circuit for producing an amplification factor signal in response to said difference signal $V_s$, and means for varying said value representing said value representing said initial pulse width in response to said amplification factor signal, and
    means for setting a peak current of said pulse current in response to said difference signal $V_s$ comprising means for supplying a value representing a minimum peak current and a peak current computing circuit for setting said peak current in response to said value representing said minimum peak current and said pulse width instruction signal.

2. The welding machine as claimed in claim 1 in which said means for correcting the quantity of heat applied to said wire electrode comprises means for adjusting the pulse width and peak value of said pulse current in accordance with a predetermined functional relation.

3. The welding machine as claimed in any preceding claim in which said pulse width instruction signal varies in accordance with a function $f=f(V_s^3)$.

4. The welding machine as claimed in claim 1 further comprising a second sensor for detecting the diameter of said consumable wire electrode for providing said signal representing said diameter of said wire, and said wire speed means further operates in response to an output from said second sensor.

5. The welding machine as claimed in claim 1 further comprising means for setting a wire feeding speed in accordance with said pulse frequency set by said frequency setting means and a signal representing the diameter of said consumable wire electrode.

6. A pulse arc welding machine comprising:
    a consumable wire electrode;
    a wire feeding unit for feeding said consumable wire electrode toward a base material;

a base current source for supplying a base current flowing between said consumable wire electrode and said base material;

a current source for supplying a pulse current superposed on said base current flowing between said consumable wire electrode and said base material;

means for setting a wire feeding speed of said consumable wire electrode toward said base material;

a sensor for detecting an arc discharge voltage between said consumable electrode and said base material;

welding voltage setting dial means;

welding current setting dial means;

wire diameter setting dial means;

comparing means for comparing an output from said sensor with an output of said welding voltage setting dial means;

an amplification factor function producing circuit for outputting an amplification factor signal as a first predetermined function of a difference signal outputted by said comparing means;

a pulse width comparing circuit for multiplying an initial pulse width instructing signal by said amplification factor to produce a pulse width instruction signal;

an initial pulse width correcting circuit comprising sample-and-hold means having an input coupled to receive said pulse width instruction signal and an output summed with said initial pulse width instruction signal at an input of said pulse width computing circuit;

a peak current computing circuit for producing a peak current instruction signal in accordance with said pulse width instruction signal and a minimum peak current instruction signal;

a pulse frequency setting circuit operating in response to an output of said welding current setting dial means for producing a pulse frequency instruction signal;

function generating means for outputting a signal representing a second predetermined function in response to an output of said wire diameter setting dial means;

a wire feeding speed computing circuit operating in response to said pulse frequency instruction signal and said signal representing said predetermined function produced by said function generating means for producing a wire feeding speed instruction signal, said wire feeding unit feeding said consumable wire electrode toward said base material at a speed determined by said wire feeding speed instruction signal;

switch instructing circuit means for setting a pulse width, peak current and frequency of said pulse current in response to said peak current instruction signal, said pulse width instruction signal and said pulse frequency instruction signal.

7. The welding machine as claimed in claim 6 wherein said amplification factor is substantially a cubic function of said difference signal.

* * * * *